April 19, 1966 L. D. NINNEMAN 3,247,304
METHOD OF AND APPARATUS FOR MAKING PLASTIC ARTICLES
Filed July 13, 1962 5 Sheets-Sheet 1

INVENTOR.
LAWRENCE D. NINNEMAN
BY Spencer L. Blaylock, Jr.
W. D. Schaich
ATTORNEYS INVENTOR.
LAWRENCE D. NINNEMAN
BY Spencer L. Blaylock, Jr
W. A. Schach
ATTORNEYS April 19, 1966 L. D. NINNEMAN 3,247,304
METHOD OF AND APPARATUS FOR MAKING PLASTIC ARTICLES
Filed July 13, 1962 5 Sheets-Sheet 5

INVENTOR.
LAWRENCE D. NINNEMAN
BY
ATTORNEYS

United States Patent Office 3,247,304
Patented Apr. 19, 1966

3,247,304
METHOD OF AND APPARATUS FOR MAKING
PLASTIC ARTICLES
Lawrence D. Ninneman, Toledo, Ohio, assignor to Owens-Illinois Glass Company, a corporation of Ohio
Filed July 13, 1962, Ser. No. 209,723
12 Claims. (Cl. 264—328)

The present invention relates to an apparatus for and method of dispensing plasticized material. More particularly, the present invention relates to a method of and apparatus for accumulating a charge of plasticized material and accurately and rapidly metering and dispensing this charge to an outlet orifice.

The present application is related to the copending application of Thomas R. Santelli, Serial No. 146,686, filed October 17, 1961, and assigned to the assignee of the present invention. In this Santelli application, there is disclosed a complete apparatus for and method of forming hollow plastic articles. The present invention relates to the plastic accumulating and dispensing system utilized in the overall Santelli apparatus and method.

More specifically, the present invention relates to the dispensing of plasticized material from an accumulated body of such material in such a manner that an extremely accurately metered charge can be delivered to a dispensing orifice, the charge later being subjected to a forming operation, either an injection molding or an extrusion operation, which may be performed at a pressure generated by a piston or the like external to the instant apparatus or at a pressure generated internally of the present apparatus. In any event, the present invention provides a unique and highly desirable system for delivering charges of plasticized material.

The specific apparatus and method utilizes an accumulator chamber within which plasticized material from a suitable source, as from a screw-type plasticizer, is accumulated under pressure, this pressure preferably being obtained from the resistance to displacement of a piston element normally disposed in the accumulator chamber and movable therein to vary the volume of the chamber. The pressure of material entering the chamber forces the piston from the chamber against a resisting back pressure. When the piston has been moved to an extent such that a predetermined and desired volume of plasticized material has been accumulated, communication between the source of material and the accumulation chamber is interrupted. The accumulation chamber remains filled until such time as there is a demand for accumulated material at the dispensing orifice. Upon such demand, material is dispensed from the chamber to the orifice at which a forming operation is performed upon the material. This forming operation may be carried out at a pressure exerted by an extraneous force-applying piston or under pressure from the accumulator piston.

In either event, an accurately metered charge is delivered to the orifice for forming, this accuracy of metering being obtained by accurate control of the volume of material actually issued from the accumulation chamber. This volume measurement is obtained primarily by means responsive to the position of the accumulator piston before and after the charge is delivered. Additional accuracy is obtained by utilization of a specific valving arrangement in which a constant volume of material is entrapped between the accumulation chamber and the orifice or such material is purged between the chamber and the orifice.

Further accuracy and operating simplicity is obtained by utilization of a single valve structure, this valve being displaceable to three different positions to interconnect the accumulator chamber and the source of plasticized material, to isolate plasticized material in the accumulation chamber, and to interconnect the accumulation chamber and the dispensing orifice. Preferably, the valve is of the longitudinally or axially displaceable type and the three-position displacement of the valve is accomplished by utilization of a valve actuating cylinder in combination with an extraneous stop cylinder.

Thus, from the foregoing discussion of the various features of the present invention, it will be appreciated that it is an important object of the present invention to provide a method of and apparatus for accurately metering and delivering a charge of plasticized material to a dispensing orifice.

Another important object of the present invention is the provision of an improved apparatus for measuring and delivering a charge of plasticized material from an accumulation chamber in which a piston is movable between predetermined positions to displace a predetermined volume of material at a desired pressure.

It is a further object of this invention to provide a new and improved method of dispensing plasticized material in the form of an accurately metered charge for subsequent forming at a dispensing orifice, the method including the steps of accumulating a predetermined volume of material, ejecting a predetermined portion of the accumulated volume and re-accumulating the predetermined volume after dispensing of the one portion.

Yet another, and no less important, object of the present invention is the provision of an improved plastic accumulating and discharging apparatus wherein plasticized material is accumulated under pressure to be stored and dispensed under the control of a valve means.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

*General apparatus and method*

In the copending application of Thomas R. Santelli, Serial No. 146,686, filed October 17, 1961, there is disclosed and claimed an overall method of and apparatus for forming hollow plastic articles. This method and apparatus includes therein an apparatus for and method of delivering to an injection mold an extremely accurately metered charge of plasticized material. Of course, the Santelli apparatus and method includes many other features including a specific injection mold structure defining, together with the remainder of the apparatus, a complete parison cavity, means for displacing the injection molded preform to a blow molding station, and means for blowing the preform at the blow molding station. Additionally, the Santelli application discloses a complete hydraulic, pneumatic, and electric control system for properly correlating the apparatus to carry out the method specifically claimed therein.

The invention described and claimed in this application, as above generally described, forms a portion only of the overall apparatus, and, similarly, the method of metering and charging the plasticized material to the injection mold forms only a part of the overall method. In order to avoid the duplication of much extraneous structure and to avoid burdening this application with unnecessary detail, the above-identified Santelli application is incorporated herein by reference, and it will be understood that the mechanism herein set forth is under the overall control system disclosed in the Santelli application.

The present invention additionally defines a modification of the charge metering and displacing mechanism wherein the metering pressures developed within the accumulator system are utilized to perform the actual injection molding step, thereby eliminating the injection ram structure and control apparatus of the Santelli application.

Figure 8:
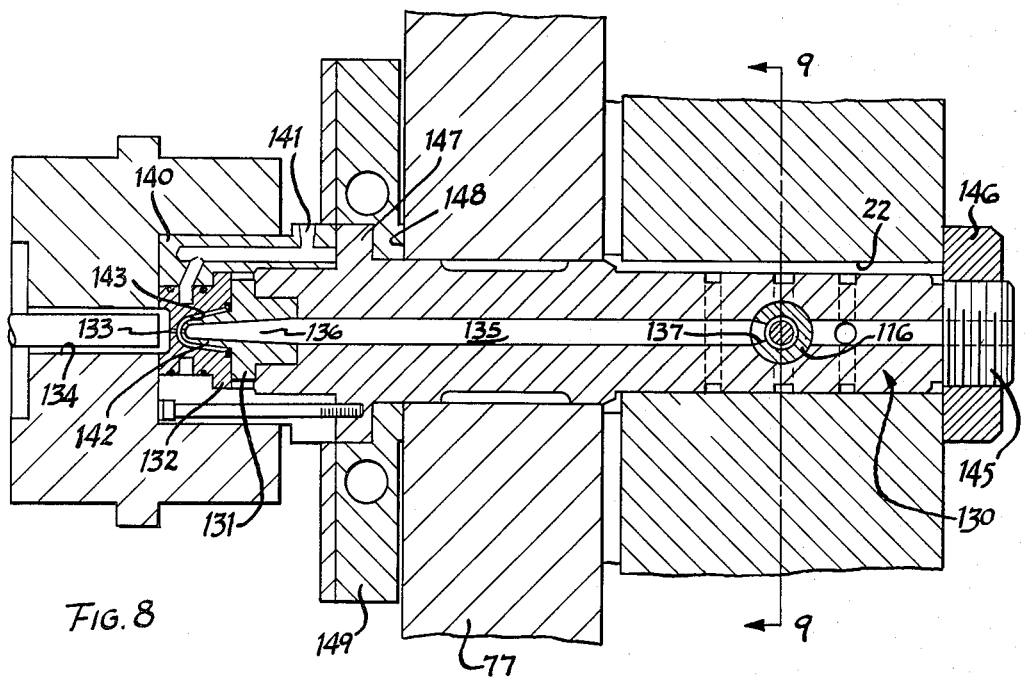
FIGURE 8 is a view similar to FIGURE 4 illustrating a modified type of apparatus.
Figure 9:
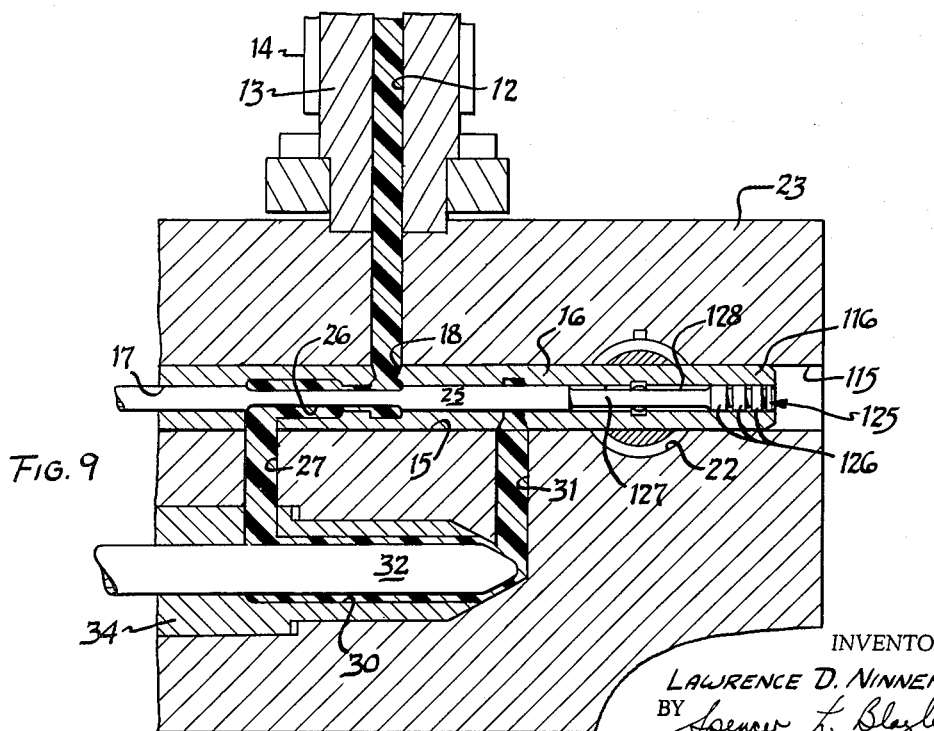
FIGURE 9 is a sectional view taken along the plane 9—9 of FIGURE 8.

The apparatus of FIGURES 1 through 7 herein is identical with the structure disclosed at FIGURES 23 through 29 of said Santelli application. The mechanism disclosed in FIGURES 8 and 9 is a modification disclosed herein for the first time.

*The apparatus of FIGURES 1 through 7*

As best illustrated in FIGURES 1 and 5–7 of the drawings, plasticized material is supplied to the machine of the present invention by means of a plasticizer screw 10 operating within a plasticizer barrel 11 to reduce pelletized or other solid plastic material to a fluid, plasticized state by the time the material attains the exit end of the screw.

The exit end of the screw communicates with an elongated material passage 12 formed interiorly of a cylindrical feed tube 13 adapted to be heated by exterior peripheral electrical resistance heating elements 14. The material passage 12 communicates by port 18 with a transverse valve bore 15 in which is positioned a valve sleeve 16 having an axial bore 17 communicating freely with the vertical bore 20 of a ram sleeve 21 in which an injection ram (hereinafter described) is vertically reciprocated. The sleeve 21 is seated in a concentric bore 22 formed in an accumulator block 23. This same block is bored to provide the valve sleeve bore 15 and the extreme end 18 of the material passage 12.

Figures 1, 2:
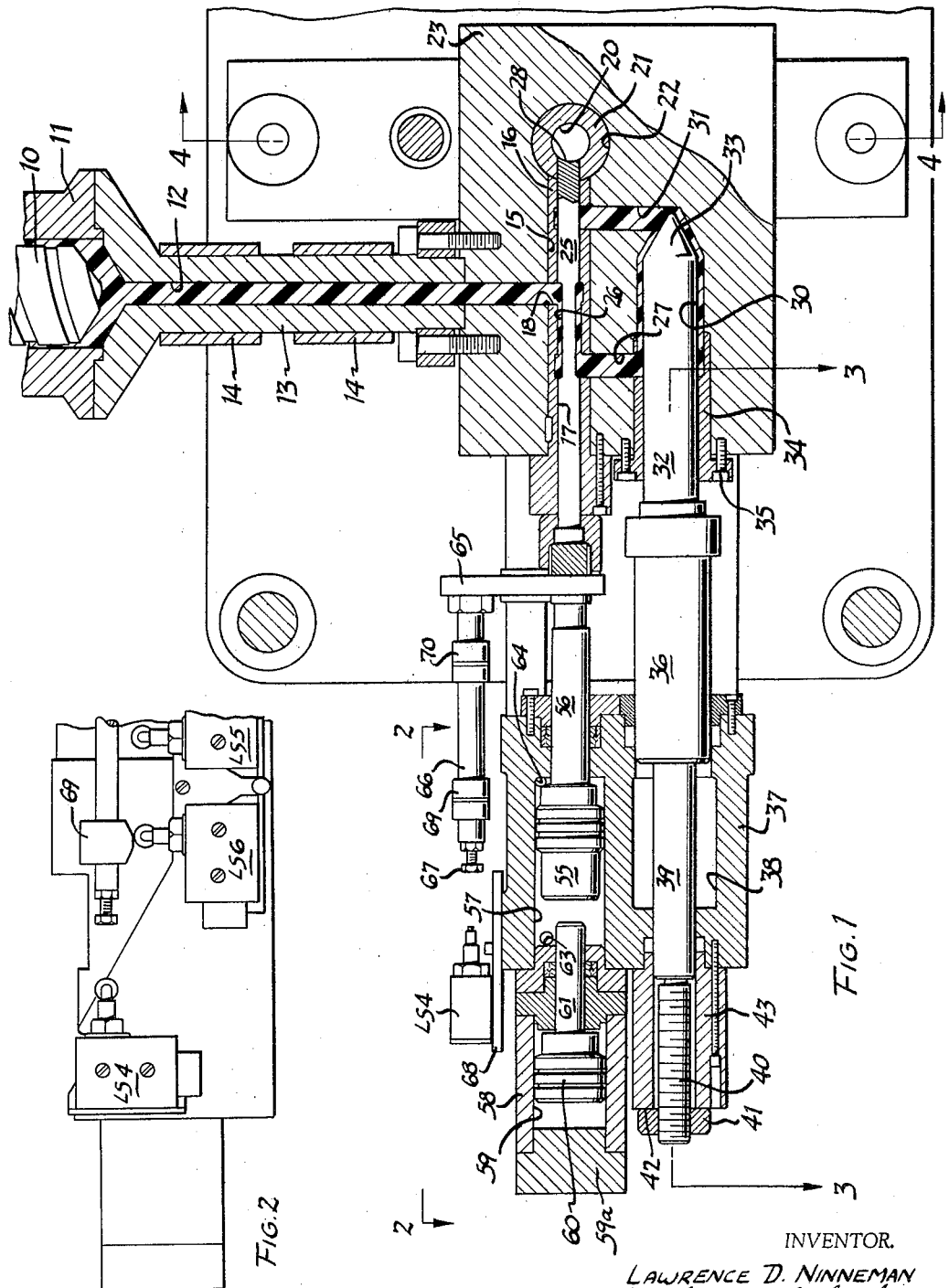
FIGURE 1 is a horizontal sectional view, with parts shown in elevation, of an apparatus of the present invention capable of carrying out the method of the present invention.
FIGURE 2 is an elevational view taken along the plane 2—2 of FIGURE 1.
Figure 3:
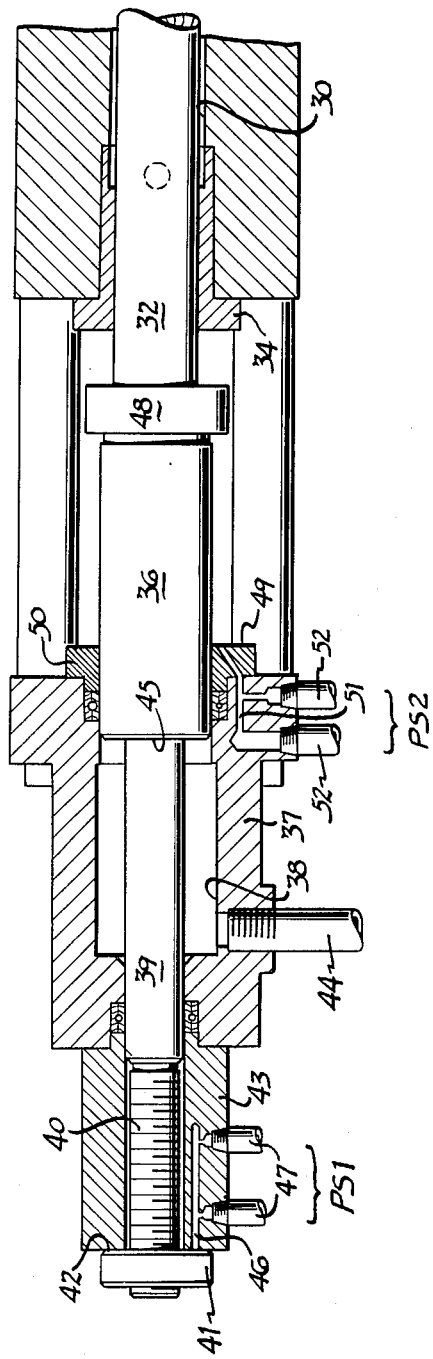
FIGURE 3 is a sectional view taken along the plane 3—3 of FIGURE 1.

Longitudinally or axially reciprocable in the bore 17 of the valve sleeve 16 is a plastic flow control valve indicated generally at 25. This valve 25 is cylindrical in configuration and is provided with a medial reduced diameter groove 26 of axial extent sufficient to bridge the space between the material inlet passage 18 and an accumulator inlet passage 27 formed in the block 23, when the valve is positioned as illustrated in FIGURE 1. The valve 25 is provided with an arcuate leading end 28 struck on a radius equal to the radius of the ram sleeve bore 20, so that the free end 28 of the valve 25 blends smoothly with the bore 20 when the valve is positioned as shown in FIGURE 1. Both the valve sleeve 16 and the valve 25 are fixed against rotation.

The accumulator inlet passage 27 communicates with a generally cylindrical accumulator space 30, the space being tapered toward an outlet end at which an accumulator outlet passage 31 is provided. This outlet passage 31 communicates with the bore 17 of the valve sleeve 16 intermediate the material passage 18 and the ram sleeve bore 20.

Disposed within the accumulator space 30 for axial displacement therein is an accumulator piston 32 having a tapered nose 33 conforming in contour to the tapered end of the accumulator space. This piston 32 is guided for axial displacement in a guide sleeve 34 concentric with and partially defining the inlet portion of the accumulator space 30 and secured to the accumulator block 23 by suitable means, as by screws 35.

The accumulator ram 32 is provided with a medial cylindrical portion 36 disposed exteriorly of the accumulation space 30 and the accumulator block 23 and projecting axially into a cylinder block 37 having an interior cylinder cavity 38 of slightly larger diameter than the medial portion 36 of the ram 32. The ram portion 36 is joined by a reduced axially elongated extension 39 to a threaded terminal portion 40 bearing an adjustable nut 41, this nut abutting the rear extremity 42 of a sleeve 43 enclosing and peripherally guiding the portion 39.

Figure 5:
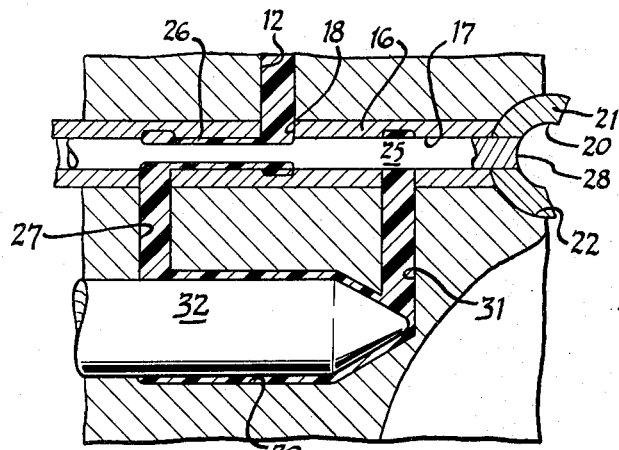
FIGURES 5, 6 and 7 are fragmentary views similar to FIGURE 1 illustrating various operative conditions of the apparatus and the corresponding steps of the method.
Figure 6:
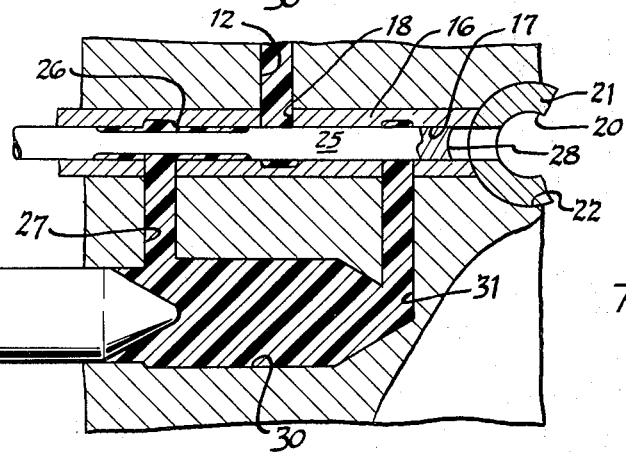
Figure 7:
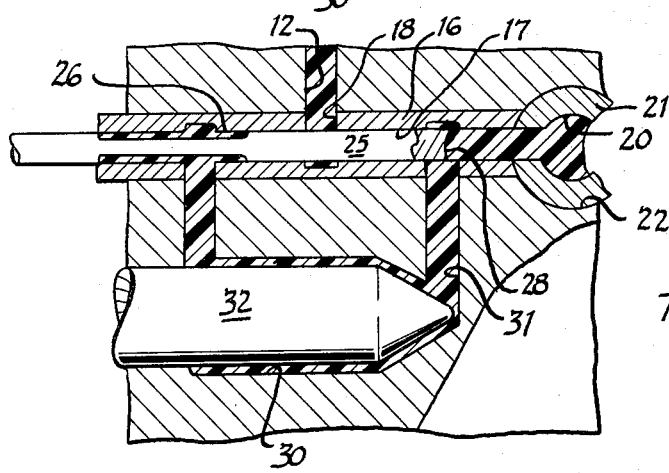

The ram 32 is supported for axial or longitudinal displacement from its forwardmost position illustrated in FIGURES 5 and 7 to its rearmost position illustrated in FIGURE 6. Such axial displacement of the ram is guided by the guide bushing 34 adjacent the forward end thereof and by the cylindrical guide member 43 engaging the cylindrical extension 39 adjacent the rear end thereof. The cylinder space 38 is adapted to receive hydraulic fluid through a conduit 44, the introduction of fluid pressure into the space 38 through the conduit 44 (FIGURE 3) displacing the accumulator ram 32 to the right (to its illustrated position of FIGURE 7) by the exertion of fluid pressure onto the rear radial face 45 of the piston portion 36 of the ram 32. As will be hereinafter more fully described, the introduction of plasticized material into the accumulation chamber 30 will act upon the free forward end 33 of the accumulator ram 32 and will displace the ram rearwardly to its illustrated position of FIGURE 6.

The rear guide sleeve 43 is provided with an air passage 46 (FIGURE 3) connected to a suitable source of compressed air through a conventional diaphragm-actuated pressure switch by means of air conduits 47, so that the diaphragm of the pressure switch will be subjected to actuating air pressure when the nut 41 closes that end of the passage 46 opening onto the rear face 42 of the sleeve 43, otherwise air within the conduit 46 will escape freely therefrom. The conduits 47 are connected to a pressure switch identified as PS1 in the above-identified application of T. R. Santelli. This switch PS1 is actuated upon abutment between the nut 41 and the sleeve 43, thereby indicating that the ram 32 is in its forwardmost position and the accumulator chamber 30 is discharged (i.e. in its forwardmost position illustrated in FIGURES 1, 5 and 7).

An indication that the accumulator chamber is filled is afforded by an enlarged collar 48 (FIGURE 3) located at the forward end of the piston portion 36 of the ram 32 and abutting the free face 49 of a bushing 50 located at the forward end of the cylinder chamber 38. The bushing 50 is provided with an air passage 51 communicating with a pressure switch PS2 through air line 52. Thus, actuation of the pressure switch PS2 will occur upon abutment between the collar 48 and the face 49 of the bushing 50, thereby indicating that the ram is in its position of FIGURE 6, the accumulator being filled with plasticized material.

Filling and emptying of the accumulator is, of course, under the control of the plasticized material flow valve 25. This valve 25 is actuated by a piston 55 joined to the valve by a rod 56, the piston being confined in a cylinder recess 57 formed in the cylinder block 37. The open rear end of the recess 57 is closed by a stop cylinder structure 58 defining an interior cylinder cavity 59 closed by a terminal cavity plug 59a.

Disposed within the cylinder cavity 59 is a stop piston 60 having a piston rod 61 projecting into the cylinder recess 57 for abutment with the piston 55 under certain operating conditions. By means of the piston 55 in combination with the stop piston 60, the valve 25 can be moved to the three operating positions illustrated in FIGURES 5 through 7, respectively. In FIGURE 5, the valve 25 is illustrated in its forwardmost or "closed" position, at which fluid under pressure is introduced into the rear of the stop cylinder recess 59 and through port 63 into the rear of the actuating cylinder recess 57. Accordingly, the piston 55 is displaced forwardly out of contact with the piston rod 61 of the stop cylinder 60. Thus, the valve is positioned to interconnect the plasticized material inlet passage 18 and the accumulator inlet passage 27 by means of the peripheral valve groove 26.

Under these circumstances, plasticized material flows into the accumulator space 30 and will displace the accumulator ram 32 rearwardly against the hydraulic resistance of fluid in the chamber 38, this "back pressure" in the line 44 being regulated as defined in said Santelli application. When the accumulator ram 32 has been displaced rearwardly and the accumulator is filled, the pressure switch PS2 will be actuated, as heretofore described. In accordance with the control system fully described in the above-identified Santelli application, flow of pressure fluid through the port 63 is interrupted (in response to actuation of switch PS2) and pressure fluid is introduced through the port 64 to displace the piston 55 rearwardly.

It will be noted that the piston rod 56 joins the forward or right hand face of the piston 55. Therefore, the only area of piston 55 exposed to pressured fluid entering through line 64 will be the area of the piston 55 minus the area of the rod 56. This differential area is less than the area of the completely exposed rear face of the stop piston 60. Accordingly, pressure within the cylinder chamber 59 on the piston 60 will maintain the piston 60 in its right-hand or forward position even though the piston 55 is displaced rearwardly.

Thus, the valve 25 will be stopped in its mid-position (that position illustrated in FIGURE 6 of the drawings) and wherein the valve groove 26 is positioned to the left of the material inlet passage 12, so that no more material will be introduced into the accumulator space 30. At the same time, the forward or free end 28 of the valve 25 is still interposed between the sleeve bore 20 and the outlet passage 31, so plasticized material cannot escape from the accumulator space 30.

When there is a demand for plasticized material in the sleeve bore 20, the flow of pressured fluid through the stop cylinder chamber 59 is vented to the sump, allowing displacement of the stop piston 60 to the left, i.e. into abutment with the plug 59a. This retraction of the piston rod 60 will accommodate movement of the piston 55 to the rear under the pressure of fluid continuously introduced through the port 64, thereby moving the valve 25 to its position illustrated in FIGURE 7 of the drawings which is its "open" position.

At this open position, the forward face 28 of the valve 25 is retracted to uncover the outlet passage 31 and plasticized material is allowed to escape from the accumulator space 30 and into the sleeve 20 through the bore 17 of the valve sleeve 16. At the same time, fluid pressure in the chamber 38, introduced thereinto through the conduit 44, will displace the accumulator ram 32 forwardly to empty the accumulator space 30 under the pressure of the ram 32.

To correlate the movement of the valve 25 with the remainder of the apparatus, the piston rod 56 carries a transversely projecting bracket arm 65 provided with a rearwardly extending actuating arm 66 (FIGURES 1 and 2). This actuating arm is provided with an adjustable abutment 67 at its extreme rear end for actuating a push-type limit switch LS4 mounted on a bracket 68 secured to the cylinder block 37. The actuating arm 66 also carries a pair of longitudinally adjustable actuating cams 69 and 70 for actuating additional push-type limit switches LS5 and LS6 also carried by the cylinder block 37.

Figure 4:
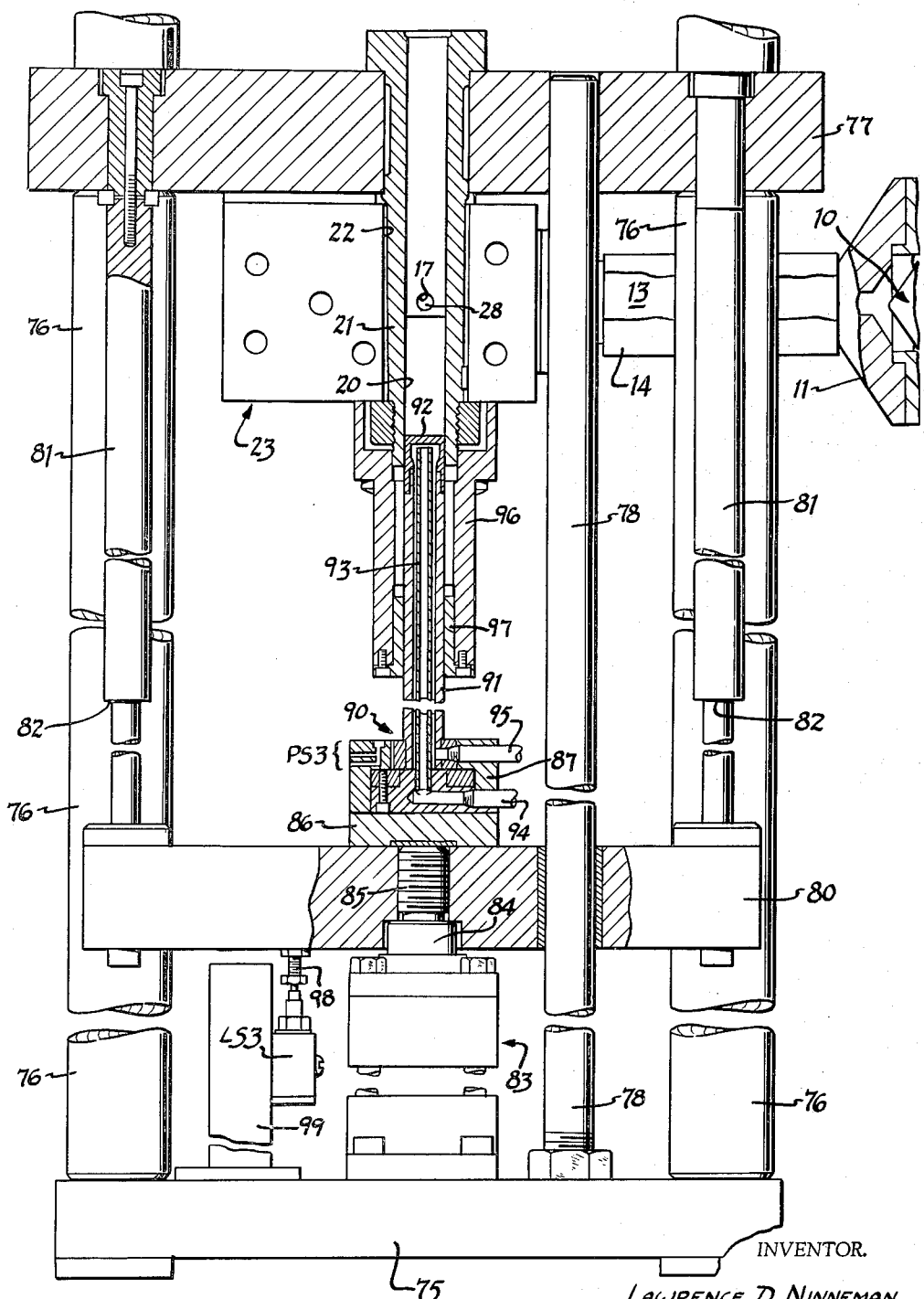
FIGURE 4 is a vertical sectional view taken along the plane 4—4 of FIGURE 1.

As illustrated in Figure 4, the machine includes a machine base 75 provided with upright columns or supports 76 supporting an upper table element 77. Depending from this table element 77 and secured thereto is the accumulator block 23 heretobefore described. This block 23 has the vertical bore 22 therein to receive the injection sleeve 21, the bore 20 of which communicates through orifice 17 with the accumulation chamber. The sleeve 21 thus is secured to the table element 77 to depend therefrom through the accumulator block 23.

Also carried by the table element 77 is a vertically disposed guide rod 78 which is also secured to the base 75 for guiding a vertically reciprocal ram cross head 80. This cross head 80 is further guided for such vertical movement by additional guide elements including elongated guide rods 81 having downwardly facing stop shoulders 82 thereon.

The cross head 80 is actuated for vertical displacement by a fluid pressure actuated cylinder 83, the piston rod 84 of which is secured to the cross head 80 by suitable means, as by threads 85. Located centrally of the cross head 80 is a mounting block 86 surmounted by a cap 87 confining therein the lower extremity of a piston structure indicated generally at 90 and including an elongated tubular piston body 91 surmounted by a hollow piston head 92.

Extending axially through the piston body 91 is a fluid inlet tube 93 communicating with a source of coolant, such as water under pressure, through an inlet conduit 94 carried by the cap 87. Also carried by the cap 87 is a fluid outlet tube 95 communicating with the annular space between the tubular piston body 91 and the inlet tube 93. From this structure, it will be readily apparent that fluid introduced through the inlet tube 94 will pass upwardly through the inlet tube 93 to impinge upon the undersurface of the hollow piston head 92, the water then draining down between the inlet tube 93 and the piston body 91 for egress through the outlet tube 95.

It will be seen that in the lowest position of the cross head 80, the piston head 92 is in the lower end of the sleeve 21, specifically within the bore 20 thereof. Upon actuation of the cylinder 83, the piston rod 84 will be extended by the cylinder to raise the cross head 80, guided by the guide element 78, to elevate the piston for passage through the bore to pick up the plasticized material introduced into the bore through the accumulator orifice 19. This movement of the piston is further guided by means of a guide sleeve 96 depending from the accumulator block 23 and having at its lower end a guide bushing 97 snugly embracing the tubular piston body 91.

When the cross head 80 is in its lowermost position, an adjustable abutment 98 contacts a fixed limit switch LS3 secured to the machine base 75 by means of a mounting arm 99. When the cross head 80 is in its uppermost position, a pressure switch PS3 is actuated by abutment of the lower end of the bushing 97 with the upper surface of the cap 87. This switch PS3 serves the function of limit switch LS1 of the above-identified application of T. R. Santelli. The shoulders 82 on the rods 81 serve as a safety stop to prevent overtravel of the ram 90.

*The apparatus of FIGURES 8 and 9*

In that modification of the apparatus illustrated in Figures 8 and 9 of the drawings, it will be noted that the block 23, the accumulator piston 32, the valve 25, the valve sleeve 16, and the interconnecting passages are substantially the same as in that embodiment of the invention illustrated in Figures 1 through 7.

However, there are certain important distinctions. It will be noted initially that the valve sleeve bore 15 is extended axially, as at 115, to the other side of the sleeve bore 22, that the valve sleeve 16 is likewise extended, as at 116, across the bore 22 and that the valve element 25 is provided with a terminal enlargement, indicated generally at 125, extending into the extension 116 of the sleeve 16.

This valve extension 125 comprises a plurality of valve lands 126 lying beyond the bore 22 and joined to the valve body 25 by a reduced neck portion 127 which bridges the bore 22 regardless of the axially adjusted position of the bore. This reduced neck 127, in cooperation with the valve sleeve bore 17, defines a groove 128.

From Figure 9, it will be seen that the material displacing piston 90 (Figure 4) having its head 92 positioned within the bore 20 has been replaced by a fixed sleeve 130. This sleeve 130 projects through the table element 77 and carries at its forward end a joining block 131 securing the sleeve to an orifice block 132 which has a central, axial orifice opening 133 communicating with an injection mold cavity 134.

The orifice opening 133 communicates with an axial material passage 135 in the sleeve 130 by means of a similar, communicating passage 136 in the joining block 131. This material passage 135, in turn, communicates through a radial passage 137 in the sleeve extension 116 with the valve groove or flow passage 128 defined between the reduced neck 127 of the valve extension 125 and the valve sleeve extension 116.

Thus, plasticized material issued from the accumulator chamber 30 through the passage 31 and the passage 128 upon leftward retraction of the valve 25 to its relative position illustrated in Figure 7 will issue through the sleeve passage 137, the passages 135 and 136 and the orifice 133 for entry into the mold chamber 134. Further, such material will enter the chamber 134 under the pressure exerted by the accumulator piston 32.

Returning now to Figure 8 of the drawing, it will be seen that the forward end of the element 130, the joining block 131 and the orifice block 132 are peripherally surrounded by a heat exchange block 140 having therein a passage 141 for receiving a heat exchange fluid to reduce the temperature of the orifice block 132, so as to solidify material at the orifice 133 after the mold chamber 134 has been filled. Additionally, it will be noted that the joining block 131 is provided with an extended nose 142 inserted into a correspondingly shaped recess 143 in the orifice block 132. However, the recess 143 is dimensioned so that an acute space or gap exists between the nose 142 and the walls of the recess 143. This space will be filled with plasticized material upon initial filling of the mold space 134 and will serve as a thermal insulator to prevent solidification of plasticized material in the block passage 136 due to the heat exchange chilling of the orifice block 132.

Additionally, it will be noted that the extreme end of the sleeve 130 is threaded, as at 145, to receive thereon a nut 146 for accurately positioning the sleeve 130 in the bore 22, the nut serving to bottom an enlarged radial flange 147 on the sleeve 130 against a corresponding radial shoulder 148 formed as a part of a mounting block 149 bottomed against the supporting table 77.

*Operation*

The operation of the two previously described embodiments of the invention will be readily appreciated by those skilled in the art, particularly after a study of the above-identified, copending application of Santelli. However, this operation will be briefly reviewed herein, as follows.

Plasticized material issued from the plasticizer screw 10 passes from the barrel 11 through the opening or passage 12 and the sleeve opening 18 into the sleeve bore 17 whenever the valve 25 is positioned as illustrated in FIGURES 1, 5 and 9. This material then flows through the valve groove 26 and the passage 27 into the accumulator chamber 30. When the valve element 25 is positioned as above-identified, the exit passage 31 from the accumulator chamber 30 is closed. Since the material is under the pressure exerted by the extruder screw 11, this pressure will force the accumulator piston 32 from its position illustrated in FIGURES 1, 5 and 9 to its position of FIGURE 6 against the back pressure present in the cylinder chamber 38 until such time as the collar 48 abuts the stop 49 to close the pressure switch PS2.

When this position is attained, the accumulator piston 32 is in its position of FIGURE 6 and pressure is introduced through the port 64 into the valve cylinder chamber 57. Simultaneously therewith fluid under pressure is introduced into the stop cylinder space 59 so that the valve 25 is moved to the left to its mid-position of FIGURE 6. At this position, the inlet opening 18 is blocked by the valve 25, in effect interposing the valve between the supply of plasticized material and the accumulator chamber. However, the valve has not been retracted sufficiently to uncover the outlet passage 31. Thus, the material in the accumulator chamber 30 is maintained under the pressure of the fluid in the cylinder chamber 38 exerted upon the piston 36.

When it is desired to discharge the accumulator, it is merely necessary to release fluid pressure in the stop cylinder chamber 59, thus allowing the stop piston 60 to move rearwardly from its blocking position. Fluid under pressure from the port 64 will move the valve piston 55 rearwardly within its chamber 57, and the valve 25 will be shifted to its full retract position of FIGURE 7.

At this time, the accumulator piston 32 travels forwardly under the pressure constantly exerted thereon by fluid in the chamber 38, and the accumulator is discharged to place material from the passage 31 into the valve sleeve bore 17 and hence into the sleeve passage 20. As the accumulator travels forwardly, its motion continues until such time as the nut 41 actuates the pressure switch PS1, indicating full discharge of the accumulator. At this time, fluid under pressure is introduced into the cylinder chamber 57 through the port 63 to displace the valve body 25 forwardly to its illustrated position of FIGURES 1 and 5. This movement of the valve body displaces the remainder of plasticized material within the valve sleeve bore 17 into the ram bore 20. The valve forward motion thus purges the valve sleeve bore 17 and insures the delivery of all the previously accumulated material into the path of travel of the ram face 92. The ram 92 then travels forwardly or upwardly within the bore 20 carrying the plasticized material into the mold chamber superimposed upon the bore 20, as illustrated in the above-identified Santelli application.

As heretofore explained, in the embodiment of FIGURES 8 and 9, the injection ram 90 has been eliminated and forward displacement of the valve body 25 after discharge of the accumulator will merely prevent any further discharge from the accumulator and will trap material in the passages 137, 135 and 136 and the orifice 133 under the pressure previously exerted by the accumulator piston 32. This is the function of the elongated valve body groove 128.

When the accumulator is discharged, the first land 126 at the remote end 125 of the valve body 25 is positioned such that the groove 128 bridges the space between the accumulator outlet passage 31 and the sleeve radial passage 137. Thus, material from the accumulator can readily flow into the passage 135 for entry into the mold space 134.

After full discharge of the accumulator, the valve body 25 is merely shifted to its illustrated position of FIGURE 9. The volume of material within the valve groove 128 does not change, but material in the passage 135 is trapped under the pressure previously exerted thereon by the accumulator piston 32. The purpose of the multiple lands 126 is to prevent any leakage of plasticized material under this pressure through the open right hand end of the valve sleeve bore 17.

Thus, it will be readily appreciated that the present invention provides a new and novel structure for extremely accurately metering plasticized material for a molding operation. This molding operation may be an injection forming operation, an extrusion forming operation, or any other desired operation in which an accurately metered charge is desired.

The molding operation may be carried out under the pressure exerted by a separate injection ram or the like, as in the embodiment of FIGURES 1 through 7, or the injection molding operation or the like may be carried out under the pressure exerted by the accumulation piston, as in the embodiment of FIGURES 8 and 9 of the drawings. In either event, the extremely accurately metered plasticized material charge is accurately and fully delivered to the forming station.

In the embodiment of FIGURES 1 through 7, this delivery is accomplished by the injection ram which displaces all of the charge into the molding cavity. In the embodiment of FIGURES 8 and 9, this delivery is accomplished under the pressure of the accumulator piston 32, there being a certain volume of plasticized material filling the constant volume passages to the mold space 134 and the constant volume valve groove 128.

The heretofore described accumulator arrangement affords very accurate metering for material from the accumulator into the sleeve bore 20. The threaded adjustment of the nut 41 upon the threaded shank 40 of the accumulator ram 32 affords means for accurately positioning the accumulator ram 32 within the accumulator space 30 at the forward or dispensing end of the accumulator ram stroke. When this accuracy of adjustment is coupled with the extreme sensitivity of the pressure switch PS1, it will be readily appreciated that the position of the ram 32 may be adjusted with extreme accuracy. Since the volume displaced by the ram during its stroke is dependent upon its position before and after stroking, this accuracy of positioning can be equated with accuracy of volume delivery.

Secondly, it will be noted that the ram does not engage the side walls of the accumulator space, but rather cantilevers freely into the ram space, thereby avoiding the necessity of sealingly engaging the hot plasticized material with a sealed piston. Thus, leaks past the accumulator piston are avoided, and frequent replacement of seals is not necessary.

Further, upon completion of the forward stroke of the ram 32, the valve 25 is moved to its position of FIGURE 5 so that any material trapped between the leading face 28 of the valve and the bore 20 is displaced by the valve face into the bore. The contouring of the valve face 28 to the periphery of the bore insures the full scraping of all of the material from the valve face by the injection ram.

It will also be noted that the flow of material from the plasticized material passages 12 and 18 through the valve recess 26 and into the accumulator space 30, and from the accumulator space into the sleeve 20 is always in a forward direction. There are no pockets or dead areas in which the accumulated material may congregate. The utilization of material from the plasticizer screw 10 to move the accumulator ram rearwardly against back pressure, as hereinafter described, insures that the material located within the valve groove 26, the inlet port 27, and intermediate the ram and the walls of the accumulator space is displaced forwardly into the path of advancement of the ram as the accumulator space is filled for the next dispensing operation.

I claim:

1. In a plastic molding machine for molding articles from plasticized thermoplastic material, an accumulator structure for storing said plasticized material from a plasticizer intermediate successive issues of material through a dispensing orifice, comprising means defining an accumulator cavity, a piston insertable into and retractable from the cavity to vary the volume of accumulated material, an elongated material flow passage having spaced ports communicating with the accumulator, with the plasticizer and with the orifice, respectively, a single valve means in said passage movable to a plurality of positions to selectively (1) interconnect said plasticizer and said cavity to fill the same, (2) to isolate material in said cavity, and (3) to interconnect said cavity and said orifice, means for moving said valve in response to the positioning of said piston to perform the valve functions (1) and (2) above, and means for moving said value in response to machine demand to perform step (3) above.

2. A plastic accumulating and discharge system for a molding apparatus wherein plasticized material from a plasticizer is supplied under pressure to a dispensing orifice, comprising an accumulation chamber interposed between said plasticizer and said orifice, a piston movable into and out of said chamber to vary the effective chamber volume, power means normally urging said piston into said chamber at a substantially constant pressure, a single movable valve means having separate valving portions interposed between said plasticizer and said chamber and between said chamber and said orifice, respectively, value actuating means responsive to the positioning of said piston for moving said valve means to separate positions for (1) interconnecting said plasticizer and said chamber to fill the chamber with plasticized material supplied under pressure from said plasticizer, and (2) isolating said chamber from both said plasticizer and said orifice, and means for actuating said valve to a separate position, (3) interconnecting said chamber and said orifice to accommodate dispensing of plasticized material from said chamber, said material in said chamber being always subject to the pressure exerted thereon by said power means.

3. In a method of making a plastic article wherein material supplied by a plasticizer is intermittently dispensed through an orifice and into a mold space, the steps of supplying material to an accumulator space under the output pressure of said plasticizer, storing material in said space and under pressure from a separate source when a predetermined volume of material has been accumulated, ejecting from said space under pressure from said separate source a controlled portion only of said accumulated volume, and substantially simultaneously (1) isolating the ejected portion from said accumulator space, (2) interconnecting the plasticizer and said accumulator space, and (3) expressing said material into the mold space under pressure from a source other than the pressure exerted on material in said accumulator space.

4. A plastic accumulating and discharging apparatus for a molding machine and including a plasticizer for supplying plasticized material at a plasticizer output pressure and a dispensing orifice, comprising an accumulator block having an interior cavity provided with an inlet opening for receiving material from the plasticizer and an outlet opening through which material is supplied to said orifice, an accumulator piston projecting freely into said cavity and movable relative thereto to define an accumulator space of varying volume, means constantly urging said piston into said chamber and providing a lesser back pressure against which the accumulator space is filled from the plasticizer and at the plasticizer output pressure, a single movable valve means comprising an element having separate blocking portions adapted to be interposed between said space and said plasticizer and between said space and said orifice, respectively, means for moving said valve element and responsive to the position of said accumulator piston (1) to position said element to block communication between said accumulator space and both said orifice and said plasticizer when said space is full, (2) to position said element to block communication between said space and said orifice when said space is in communication with said plasticizer, and means independent of the positioning of said piston (3) to position said element to interconnect said space and said orifice while blocking communication between said space and said plasticizer.

5. In a method of making a plastic article wherein molten thermoplastic material supplied by a plasticizer is intermittently dispensed through an orifice and into a mold space, the steps of supplying said molten material to an accumulator space from said plasticizer, said accumulator space being larger than said mold space, isolating a known volume of material in said accumulator space under a pressure from a source other than the plasticizer, ejecting from said space under pressure from said source an established portion of said accumulated volume substantially equal to the volume of said mold space, advancing said material toward said mold space through a supply passage to fill the mold space at least partially with earlier ejected material under pressure from said source, entrapping at least some of the so advanced material in said passage to maintain material in the mold under pressure from said source, and supplying fresh molten material to said accumulator space without varying the volume of the entrapped material.

6. A plastic accumulating and discharge system for filling a mold with molten plasticized thermoplastic material supplied from a plasticizer at a plasticizer output pressure, comprising an accumulation chamber interposed between said plasticizer and said mold, a piston movable in said chamber to vary the effective chamber volume, means normally urging said piston into said chamber at a substantially constant pressure to reduce the volume thereof, the plasticizer output pressure being greater than said substantially constant pressure, a movable valve means having separate valving portions adapted to be interposed between said plasticizer and said chamber and between said chamber and said mold, respectively, and valve actuating means for moving said valve means to separate positions for (1) interconnecting said plasticizer and said chamber to fill the chamber with plasticized material at said output pressure, (2) isolating said chamber from both said plasticizer and said mold, and (3) interconnecting said chamber and said mold to fill the mold with material forced from said chamber under said substantially constant pressure.

7. In a method of making a plastic article wherein material supplied by a plasticizer is intermittently dispensed through an orifice, the steps of supplying material to an accumulator space from said plasticizer until an established volume of material has been accumulated, storing said volume of material under pressure, ejecting a portion only of said accumulated volume from said space under the storage pressure and through a supply passage and thereafter out the orifice, purging from said passage any residual material therein following ejection of material from said space, and substantially simultaneously therewith initiating the supplying step to replenish said space.

8. A plastic accumulating and discharging apparatus for a molding machine and including a plasticizer for supplying molten plasticized material under plasticizer output pressure and a dispensing orifice, comprising an accumulator block having an interior cavity for receiving material from the plasticizer and an outlet opening through which material is supplied from said cavity to said orifice, an accumulator piston projecting freely into said cavity and defining therewith an accumulator space of varying volume, means constantly urging said piston into said chamber and providing back pressure less than the plasticizer output pressure against which the accumulator space is filled from the plasticizer under plasticizer output pressure, a single valve means movable to a first position at which the valve means is interposed between said space and said plasticizer and to a second position at which the valve means is interposed between said space and said orifice, means responsive to the position of said accumulator piston (1) to actuate said valve means to its said first position between said accumulator space and said plasticizer when said space is full and (2) to actuate said valve means to its said second position between said accumulator space and said orifice when said space is empty, and means responsive to machine demand to actuate said valve means to interconnect said accumulator space and said orifice whereby molten plasticized material is issued from said space by movement of said piston.

9. In a method of making a plastic article wherein molten plasticized material initially supplied by a plasticizer under an output pressure is intermittently dispensed through an orifice, the steps of supplying material to an accumulator space from said plasticizer at said output pressure, storing material in said space and under a different pressure when a volume of material has been accumulated, ejecting from said space a controlled volumetric portion of said accumulated volume under said different pressure, and expressing said material into said mold space under said different pressure exerted on the material in said accumulator space.

10. A plastic accumulating and discharging apparatus for supplying a desired volumetric charge to a mold and including a plasticizer for supplying plasticized material and a dispensing orifice through which said charge is delivered to said mold, comprising an accumulator block having an interior cavity for receiving material from the plasticizer and an outlet opening through which material is supplied to said orifice, an accumulator piston projecting freely into said cavity and defining therewith an accumulator space of varying volume dependent upon the position of said piston, means constantly urging said piston into said chamber and providing back pressure against which the accumulator space is filled from the plasticizer, valve means interposed between said space and said plasticizer, sensing means responsive to the position of said accumulator piston when said space is full to actuate said valve means to interrupt communication between said accumulator space and said plasticizer, thereby establishing an initial accumulator volume, and sensing means responsive to the position of said piston to actuate said valve means to interconnect said plasticizer and said accumulator space when an amount of material constituting the desired charge of material has been delivered from said accumulator space under pressure of said piston.

11. In a method of making a plastic article wherein plasticized material supplied by a plasticizer is intermittently dispensed through an orifice located downstream of an accumulator space, the steps of filling the accumulator space with material from said plasticizer against the resistance of a piston movable in said space, shutting off flow of material to said accumulator space, storing a predetermined volume of material in said space under pressure exerted constantly thereon by said piston independently of said plasticizer, moving said piston a selectively settable distance to eject from said space and under said piston pressure a precise portion of said accumulated volume into a supply passage leading to said orifice, at least some of said volume of material remaining in said passage, and substantially simultaneously (1) purging from said passage any residual material therein and (2) initiating said filling step to accumulate material for subsequent ejection.

12. In a method of making a plastic article wherein molten thermoplastic material supplied by plasticizer is intermittently dispensed through an orifice, the steps of supplying plasticized material to an accumulator space from said plasticizer through a first portion of a passage and at the output pressure of said plasticizer, closing communication between the plasticizer and the accumulator space at said passage first portion after a volume of material has been accumulated, and isolating said accumulated volume of material in said accumulator space under pressure from a different source, ejecting a controlled volumetric portion only of said accumulated volume under said pressure from said different source through a second portion of said passage and thereafter out through the dispensing orifice, sealing said passage at said second portion from any residual material in said accumulator space following ejection of said portion from said space and substantially simultaneously therewith again supplying material to said accumulator space from said plasticizer following re-establishment of communication between the plasticizer and the accumulator space at said passage first portion.

References Cited by the Examiner

UNITED STATES PATENTS

| | | | |
|---|---|---|---|
| 2,413,401 | 12/1946 | Youngblood et al. | 264—328 |
| 2,517,161 | 8/1950 | Anderson | 222—340 |
| 2,824,673 | 2/1958 | Hanlon | 222—256 |
| 2,881,477 | 4/1959 | Truilzi | 18—30 |
| 3,068,519 | 12/1962 | Morin | 18—30 |
| 3,096,914 | 7/1963 | Kerr | 222—333 |

ROBERT F. WHITE, *Primary Examiner.*

ALEXANDER H. BRODMERKEL, *Examiner.*